Sept. 14, 1937. J. W. ANDREWS ET AL Re. 20,507

MAGNETIC MATERIAL

Original Filed April 17, 1926

Inventors
John W. Andrews
Randall Gillis
by H. Patterson Att'y.

Reissued Sept. 14, 1937 Re. 20,507

UNITED STATES PATENT OFFICE 20,507

MAGNETIC MATERIAL

John Wendell Andrews, Westfield, N. J., and Randall Gillis, Hinsdale, Ill., assignors to Western Electric Company, Incorporated, New York, N. Y., a corporation of New York Original No. 1,669,643, dated May 15, 1928, Serial No. 102,729, April 17, 1926. Application for reissue July 11, 1936, Serial No. 90,120

21 Claims. (Cl. 175—21)

This invention relates to magnetic materials and magnet cores, and more especially to magnet cores for loading coils for telephone circuits and their method of production.

The principal object of the invention is the production of a magnetic element having low core losses and a relatively high permeability to enable a given inductance to be obtained from a minimum amount of material, and possessing to a high degree those electrical and magnetic characteristics which make it highly desirable in electrical signalling apparatus, particularly in loading coils for telephone circuits.

In accordance with one embodiment, the present invention contemplates the construction of magnet cores of an alloy including nickel and iron in finely divided form, heat treated to have a higher inherent magnetic permeability and lower inherent hysteresis loss than iron, and combined with a suitable insulating material. More specifically, the invention contemplates the formation of the magnet cores of a nickel iron alloy in finely divided form in which the proportions of its constituents are more than 25% of nickel and the remainder principally iron, and in a form which has proven satisfactory the nickel content being approximately 78½% of the whole. The metal particles are treated with a solution of chromic acid in the presence of an alkali and a filler whereby the alloy particles are individually insulated after which they are compressed into cores of the desired shape and size. The cores are heat treated at the optimum temperature for the particular alloy of which the cores are constructed to stabilize the insulator and to give a high permeability and low hysteresis and eddy current losses.

Figure 1:
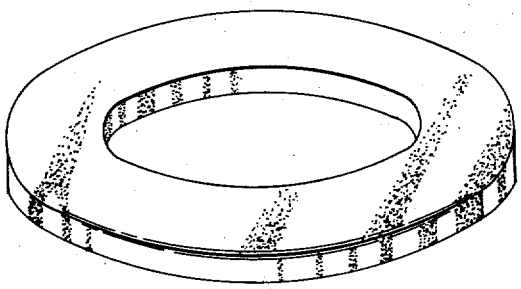
Figure 2:
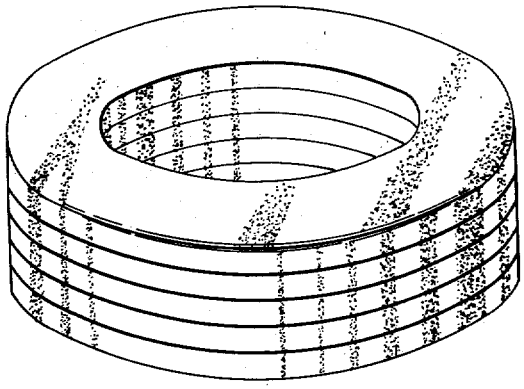

It is believed that the invention will be clearly understood from the following detailed description of one embodiment thereof and the accompanying drawing, in which Fig. 1 is a perspective view of a section of a loading coil core made in accordance with the present invention, and Fig. 2 shows a plurality of these sections assembled to form a completed core.

It will be understood, however, that this is merely illustrative and the invention is not limited to the production of this form of core, but is adapted to the production of cores for magnetic articles of many forms.

In carrying out the present invention the magnetic material is prepared in the following manner. The magnetic material employed is preferably prepared from a nickel iron alloy commonly referred to as "permalloy", which is treated in a manner more fully described in the copending application of C. P. Beath and H. M. E. Heinicke, Serial No. 101,179, filed April 10, 1926, to reduce the alloy to a finely divided form. Experience has proven that where low eddy current losses are desired it is essential that the particles be of a small size and preferably of such size that all of the particles will readily pass through what is generally known as a one hundred and twenty mesh screen and a large percentage pass through a two hundred mesh screen. According to one embodiment of the invention the alloy is prepared by melting approximately 78½ parts of nickel and 21½ parts of iron in an oxidizing atmosphere and pouring the resulting alloy into a mold. When prepared according to the foregoing process the resulting alloy will be exceedingly brittle and is therefore particularly adapted to be reduced to a finely divided or dust form from which the finished cores are molded.

After the brittle ingots are obtained they are successively passed through progressively reducing hot rolls, which form the alloy into flat slabs approximately ¼" thick. By the hot rolling process the size of the crystalline structure is materially reduced which since the disintegration of the material takes place mainly at the crystal boundaries, is essential in order to have a satisfactory yield of dust. The rolled slabs are broken into short pieces and are then crushed in a jaw crusher, hammer mill or any other suitable type of apparatus in which a further reduction occurs. The material after being passed through the jaw crusher is subsequently rolled in a ball mill until it is reduced to a fine dust. This dust is sieved through a one-hundred-and-twenty mesh sieve and any residue is remelted and the foregoing operation is again repeated to reduce the material to a finely divided form. Prior to the addition of the insulating material the finely divided particles of the nickel iron alloy are annealed in a closed container at a temperature of approximately 750° C. to 980° C., a temperature of about 925° C. having proven to be one which produces very satisfactory results. It is then necessary to again reduce the annealed alloy which is now in the form of a cake, to a finely divided form after which it is mixed with the insulator.

According to one form of the invention, the insulator for the dust particles is prepared by mixing the ingredients in approximately the following proportions: 5½ parts of chromic acid, 5 parts of talc, 4½ parts of water glass composed of 50% total solids and containing approximately 1.58 parts of $SiO_2$ to 1 part of $Na_2O$. Sufficient water is added to the ingredients to make a rather dilute solution. This solution is thoroughly mixed and the permalloy particles added to the solution, the amount of the permalloy particles added being determined by the permeability desired and the particular use to which the finished cores are to be put. The entire mass is then boiled to dryness, accompanied by constant stirring to prevent caking and to insure a thorough coating of the individual dust particles, but it is not heated to such a degree of dryness that the chromic acid loses its adhesive properties. The dried insulated dust particles are then in a form suitable for pressing into cores or rings which are preferably formed with a pressure of approximately 200,000 pounds per square inch. A high pressure is used in forming the rings in order to increase their density, since it has been found that the permeability of the rings increases with increased density. Following this step in the process of constructing the cores and without unduly exposing them to the air they are transferred to an annealing furnace in which they are annealed at the optimum annealing temperature of approximately 500° C. and cooled. In order to make the cores chemically stable and to remove all soluble substances such as chromates the cores are boiled in water until a solution obtained by boiling a crushed test ring in water will show only a trace of soluble chromates when tested with silver nitrate. After this operation the cores or rings are dried at a temperature of approximately 100° C. A few test rings may be made of dust insulated in the above manner and their permeability measured. Should their permeability be too low, it may be increased by the addition of a predetermined quantity of uninsulated dust to the insulated dust before it is pressed into rings.

A plurality of rings thus formed are then stacked coaxially to form a core on which the usual toroidal winding is applied, the number of such rings used depending upon the existing electrical characteristics of the telephone circuit with which the loading coils are to be associated.

Although the permalloy particles have been described as being insulated with a solution of chromic acid, water glass and talc in definite proportions, it is of course to be understood that the proportions of the different ingredients may be varied without departing from the spirit and scope of the invention. Also chromic acid alone may be used as the insulator in such cases where mechanical strength is not an essential characteristic of the finished cores. Then, too, other acids than chromic may be used with satisfactory results, among these being molybdic, tungstic, antimonous and phosphoric acids, and the water glass and talc may be likewise replaced with other alkalies, such as sodium hydroxide and sodium aluminate and fillers such as zinc oxide, aluminum oxide and barium oxide and still produce magnet cores which are satisfactory from both an electrical and magnetic standpoint.

By using an alloy of the proportions stated in the preceding paragraphs and by following the foregoing method of insulating the individual alloy particles and compressing the particles into cores or rings, magnet cores or rings are produced which have an extremely high permeability with a minimum amount of material employed. By the use of such cores or rings, inductance units having the same permeability with equal or less hysteresis and eddy current losses as cores constructed according to previously known methods, but with much less core volume and much less coil volume, are available.

What is claimed is:

1. As a new article of manufacture, a magnetic substance composed of the end products of a heat treated mixture of magnetic particles, chromic acid, an alkali, and a filler.

2. As a new article of manufacture, the end products of a heat treated mixture of nickel-iron alloy particles, chromic acid, an alkali, and a filler.

3. As a new article of manufacture, a magnetic substance obtained by heat treating finely divided particles of a magnetic alloy of nickel and iron separated by an insulating material comprising chromic acid, water glass, and a filler.

4. As a new article of manufacture, a heat treated magnetic substance composed of the end products of a heat treated mixture of finely divided nickel-iron alloy particles, chromic acid, an alkali, and talc.

5. As a new article of manufacture, a magnetic substance obtained by heat treating finely divided particles of a magnetic alloy of nickel and iron separated by an insulating material comprising chromic acid, water glass, and talc.

6. As a new article of manufacture, a magnetic substance composed of the end products of a heat treated mixture of finely divided nickel-iron alloy particles and an insulating material compounded of 5½ parts chromic acid, 4½ parts water glass, and 5 parts talc.

7. As a new article of manufacture, a magnetic substance composed of the end products of a heat treated mixture of finely divided particles of a magnetic alloy composed of more than 25% nickel and the remainder principally iron, chromic acid, water glass, and talc.

8. As a new article of manufacture, a magnetic substance composed of the end products of a heat treated mixture of finely divided particles of a magnetic alloy composed of more than 25% nickel and the remainder principally iron with an insulating material compounded of 5½ parts chromic acid, 4½ parts water glass, and 5 parts talc.

9. The method of making magnetic structures, which consists in coating particles of a magnetic material with an insulating material, consisting of chromic acid, an alkali and a filler, and forming a mass of such insulated particles into a homogeneous solid.

10. The method of making magnetic structures composed of an alloy, which consists in reducing the alloy to a finely divided form, heat treating the finely divided particles, reducing the product so obtained to a finely divided form, coating the resulting product with an insulating material comprising chromic acid, and forming a mass of such insulated particles into a homogeneous structure.

11. The method of making magnetic structures composed of an alloy, which consists in reducing the alloy to a finely divided form, heat treating the finally divided particles, reducing the product so obtained to a finely divided form, coating the resulting product with an insulating material comprising chromic acid, an alkali and a filler, and forming a mass of such insulated particles into a homogeneous structure.

12. The method of making magnetic structures composed of an alloy, which consists in reducing the alloy to a finely divided form, heat treating the finely divided particles, reducing the product so obtained to a finely divided form, coating the resulting product with an insulating material comprising chromic acid, forming a mass of such insulated particles into a homogeneous structure, and heating the structure to a high temperature.

13. The method of making magnetic structures composed of an alloy of more than 25% nickel and the remainder principally iron, which consists in reducing the alloy to a finely divided form, heat treating the finely divided particles, reducing the product so obtained to a finely divided form, coating the resulting product with an insulating material comprising 5½ parts chromic acid, 4½ parts water glass and 5 parts talc, and forming a mass of such insulated particles into a homogeneous structure.

14. The method of making magnetic structures composed of an alloy of more than 25% nickel and the remainder principally iron, which consists in reducing the alloy to a finely divided form, heat treating the finely divided particles, reducing the product so obtained to a finely divided form, coating the resulting product with an insulating material comprising 5½ parts chromic acid, 4½ parts water glass and 5 parts talc, forming a mass of such insulated particles into a homogeneous structure, and heating the structure at a high temperature.

15. The method of producing a magnetic structure, which consists in mixing magnetic dust with an insulating material, forming a mass of the insulated dust into a homogeneous solid, and subjecting said solid to a heat treatment at an optimum temperature determined by the point of minimum loss.

16. The method of producing a magnetic structure, which consists in mixing magnetic dust with an insulating material, forming a mass of the insulated dust into a homogeneous solid, and heating the solid to a temperature of approximately 500° C.

17. The method of producing a magnetic structure, which consists in mixing magnetic dust with an insulating material, including an acid as an element, forming a mass of the insulated dust into a homogeneous solid, and heat treating the solid at an optimum temperature determined by the point of minimum loss.

18. The method of producing a magnetic structure, which consists in mixing nickel-iron particles with an insulating material, forming a mass of the insulated dust into a homogeneous solid, and subjecting said solid to a heat treatment at an optimum temperature determined by the point of minimum loss.

19. As a new article of manufacture, a magnetic substance obtained by heat treating particles of magnetic material separated by an insulating material consisting of chromic acid, an alkali, and a filler.

20. As a new article of manufacture, a magnetic substance produced by heat treating particles of magnetic material separated by an insulating material consisting of chromic acid, water glass, and talc.

21. As a new article of manufacture, the end products of intermingled particles of a magnetic material, chromic acid, water glass and a filler compressed into a unitary structure and heat treated.

JOHN WENDELL ANDREWS.
RANDALL GILLIS.